May 18, 1948. E. H. HAUG 2,441,814
VARIABLE VOLTAGE CONTROL
Filed Feb. 8, 1944
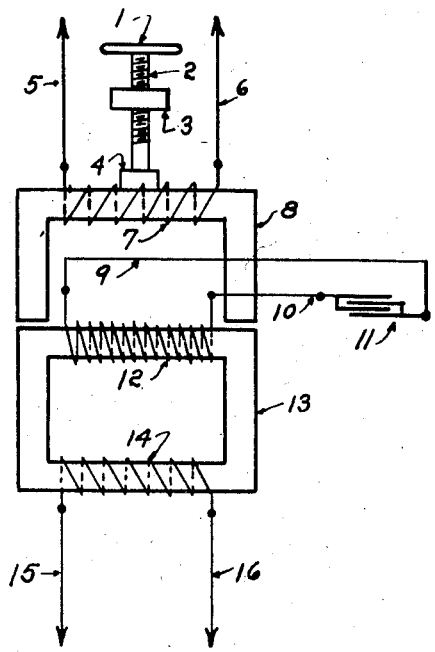
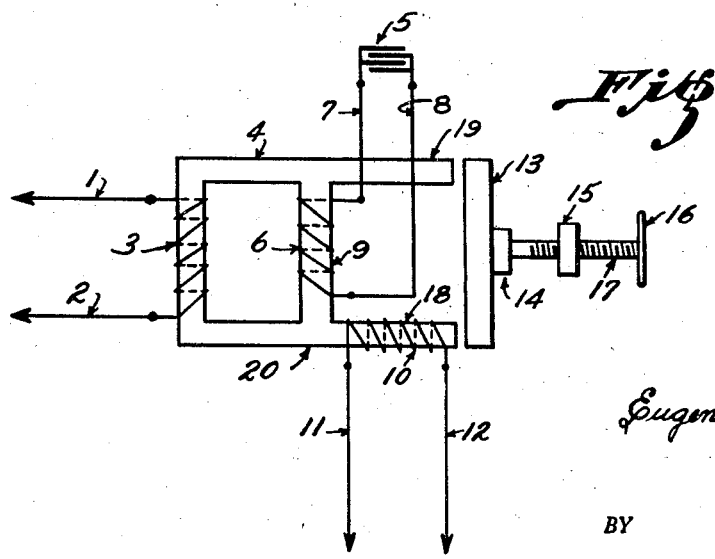
Eugene H. Haug.
INVENTOR.
BY Patented May 18, 1948

2,441,814

UNITED STATES PATENT OFFICE 2,441,814

VARIABLE VOLTAGE CONTROL

Eugene H. Haug, Glencoe, Ill., assignor, by direct and mesne assignments, to Modern Controls Inc., Chicago, Ill., a corporation of Delaware Application February 8, 1944, Serial No. 521,509

1 Claim. (Cl. 323—52)

My invention relates to a voltage control device and more particularly to a control device which does not require taps for obtaining various voltages, and furthermore a voltage control device by which the voltage can be varied at a uniform rate and without steps.

An object of my invention is to provide a voltage control device which is either manually or automatically operated to obtain any desired voltage at a uniform rate without increasing the exciting current in the primary supply circuit.

A further object of my invention is to provide any change in voltage, which is of constant potential characteristic, when taken from a constant potential source.

In the electrical art it is desirable to obtain any value of constant potential without tap change for electric furnaces, light variation, motor controls, electro-chemical applications, rectification, electric signaling, pipe thawing and rail heating devices, blowers, fans, and pumps, and for other uses.

These, and other objects that will be made apparent throughout the further description of my invention, are obtained by voltage control apparatus hereinafter described and illustrated in the accompanying drawings, wherein:

Figure No. 1 is a general wiring diagram showing control of the output voltage by varying the air gap of any part of the core of the transformer on which the secondary winding is incorporated.

Figure No. 2 is a general wiring diagram showing control of the output voltage by varying the air gap of any part of the core of the transformer which does not incorporate the secondary winding.

Referring to Figure No. 1, the alternating current supply is connected to wires 15 and 16, which in turn are connected to primary coil 14 of transformer 13. A tertiary winding 12, which is mounted on transformer core is connected to capacitor 11 by means of wires 9 and 10. Secondary coil 7 of transformer 13 is mounted on movable transformer core 8. The load is connected to secondary coil 7 by means of wires 5 and 6. An operating wheel 1 is fastened to threaded shaft 2 and is operated at support 3. Shaft 2 is furthermore connected by a swivel incorporated in support 4, which is fastened to core 8.

The operation of Figure No. 1 is as follows: when hand wheel 1 is turned to the left core 8 increases its air gap from transformer 13. This in turn causes the flux interleakage in secondary coil 7 to be reduced, and thereby reduce the voltage in wires 5 and 6. At the same time the flux interleakage of tertiary winding 12 increases proportionally, increasing the voltage to capacitor 11 and thereby producing a leading counter flux. Since the counter flux in secondary coil 7 has been reduced by the same proportion that counter flux in teritary winding 12 has been increased, the total counter flux to primary coil 14 will remain the same, thereby holding the exciting current to primary coil 14 constant under all conditions of voltage variations.

The operation of Figure No. 2 is the same as in Figure No. 1, the only difference being that in Figure No. 1 the movable core incorporates one of the windings while in Figure No. 2 it does not.

While I have described what I at present consider the preferred embodiment of my invention, it will be obvious to those skilled in the art that various changes and modifications may be made without departing from my invention, and I therefore aim in the appended claim to cover all such changes and modifications as fall within the true spirit and scope of my invention.

What I claim as new and desire to secure by Letters Patent of the United States is:

In combination with a constant potential transformer, a primary winding, a tertiary winding being wound on the same core as the primary winding, and being connected to a device producing a leading current, a secondary winding being on a core so arranged that one or more variable air gaps can be introduced in a manner that the amount of flux interleakage may be varied in said secondary coil, and thus introducing a variable voltage in the output circuit of said secondary coil while at the same time maintaining a constant flux interleakage in said primary coil, and thereby holding the primary exciting current constant under all secondary voltage conditions.

EUGENE H. HAUG.

REFERENCES CITED

The following references are of record in the file of this patent:

UNITED STATES PATENTS

| Number | Name | Date |
|---|---|---|
| 1,385,170 | Herz | July 19, 1921 |
| 1,559,570 | Lucas | Sept. 14, 1926 |
| 1,756,875 | Montsinger | Apr. 29, 1930 |
| 2,001,557 | Ohlsen | May 14, 1935 |
| 2,207,234 | Bohm | July 9, 1940 |
| 2,340,791 | Burdick | Feb. 1, 1944 |